United States Patent [19]

Ballu

[11] Patent Number: 4,561,591
[45] Date of Patent: Dec. 31, 1985

[54] MOBILE APPARATUS FOR SPRAYING A LIQUID FOR THE TREATMENT OF PLANTS

[75] Inventor: Patrick J. M. Ballu, Reims, France

[73] Assignee: Tecnoma, Epernay, France

[21] Appl. No.: 461,218

[22] Filed: Jan. 26, 1983

[30] Foreign Application Priority Data

Jan. 29, 1982 [FR] France ................ 82 01418

[51] Int. Cl.⁴ .............. A01M 7/00; A01M 21/00; B05B 9/06; B05B 15/06
[52] U.S. Cl. .................................. 239/159
[58] Field of Search ............... 239/159, 164–168

[56] References Cited

FOREIGN PATENT DOCUMENTS

| | | | |
|---|---|---|---|
| 154595 | 4/1953 | Australia | ............ 239/168 |
| 1607387 | 10/1969 | Fed. Rep. of Germany . | |
| 1564543 | 4/1969 | France . | |
| 2100130 | 3/1972 | France . | |
| 2305116 | 10/1976 | France . | |
| 2373229 | 7/1978 | France . | |
| 2014834 | 9/1979 | United Kingdom . | |

*Primary Examiner*—Andres Kashnikow
*Attorney, Agent, or Firm*—Watson, Cole, Grindle & Watson

[57] ABSTRACT

The invention relates to a mobile spraying apparatus, particularly for the treatment of plants. This apparatus comprises a spray-distributor which is carried above the ground by a tractor vehicle or trailer vehicle in an approximately horizontal position. The distributor is suspended below a support carried by the vehicle in the manner of a pendulum, by means of a ball-and-socket bearing, so as to remain approximately horizontal, and it is guided by rollers rolling on appropriate surfaces.

9 Claims, 5 Drawing Figures

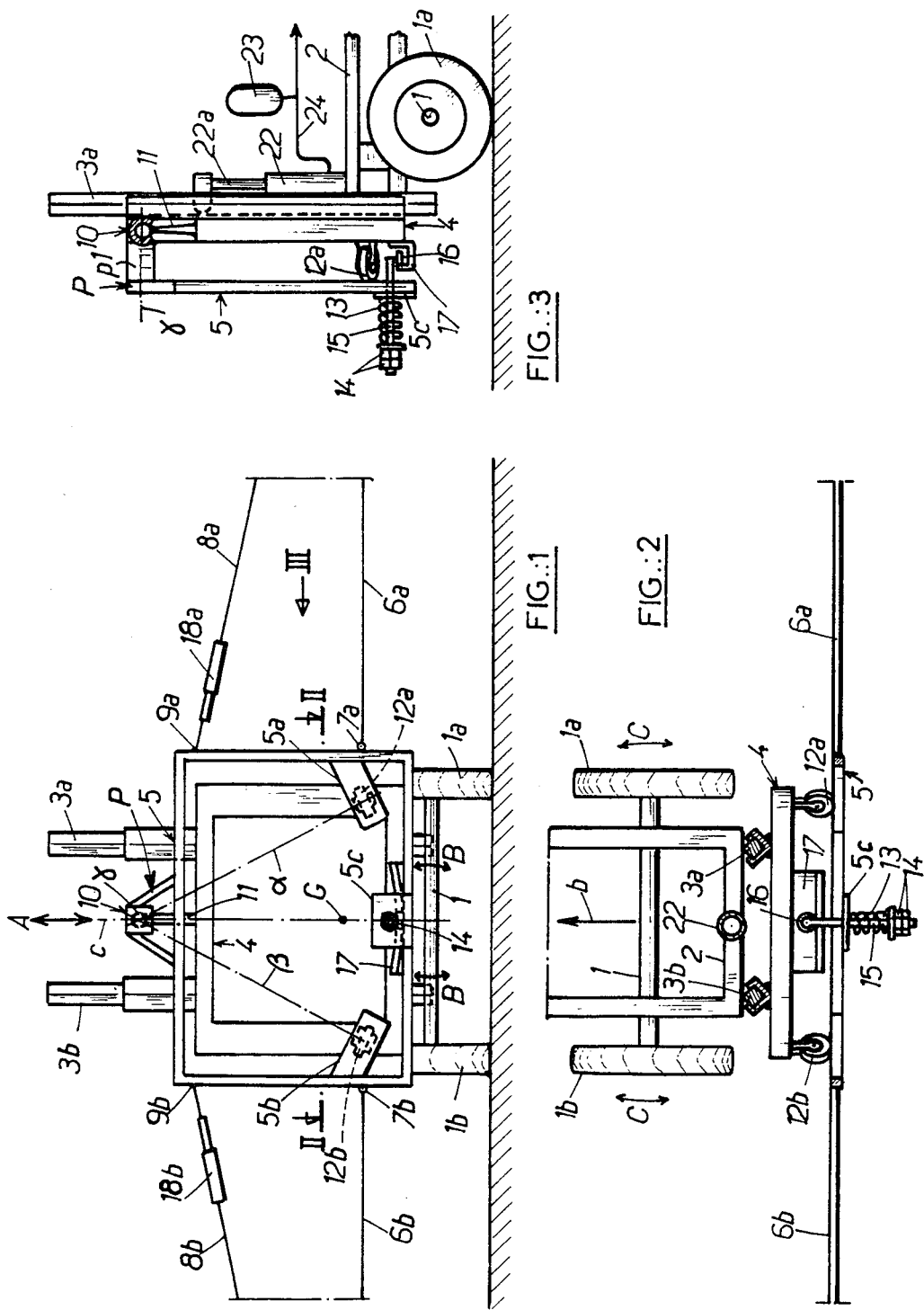

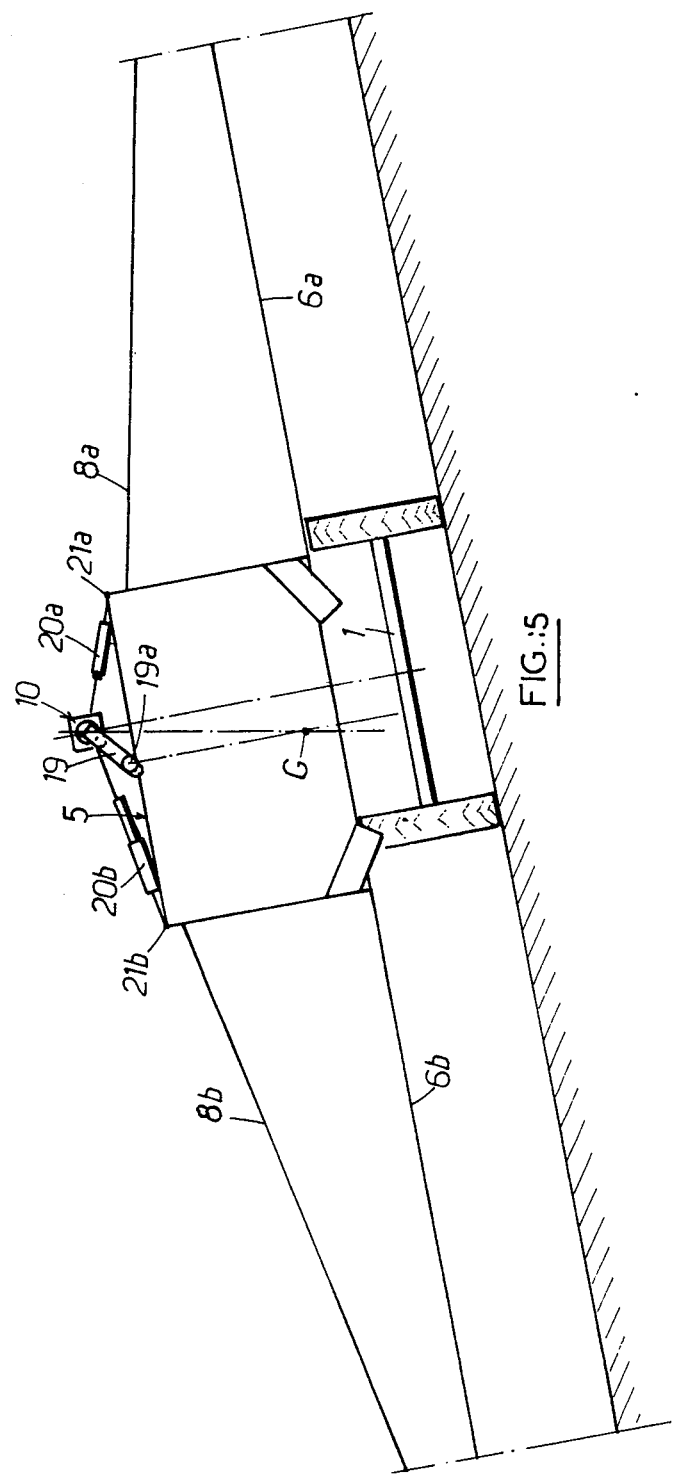

MOBILE APPARATUS FOR SPRAYING A LIQUID FOR THE TREATMENT OF PLANTS

The present invention relates to a mobile apparatus for spraying a liquid for the treatment of plants.

Various types of mobile apparatus are already known for this application, each of which comprises at least one spray-distributor which is carried above the ground by a tractor vehicle or trailer vehicle in a position that is approximately horizontal and at right angles to the direction of forward movement of the vehicle.

In the known apparatuses of this type, the spray-distributor is mounted generally at the rear of the vehicle with which it is integrated; nevertheless, in certain embodiments, means are provided for adjusting its height above the ground by letting it slide vertically on the support integrated with the vehicle. All shocks and vibrations to which the vehicle is subjected during its forward movement are thus transmitted, virtually without damping, to the distributor, the movement of which, relative to the ground, is therefore very different from the uniform horizontal translation movement which would be desirable for obtaining perfectly uniform spreading of the sprayed liquid on the plants to be treated. This lack of spreading uniformity results not only from the vertical oscillations that the vehicle may transmit to the distributor, but also from the pivoting of the axle or axles of the vehicle, especially about an axis that is approximately horizontal and parallel to the direction of forward movement of the vehicle (rolling oscillations of the vehicle) or about an axis that is approximately vertical (yawing oscillations due to slight displacements of the vehicle on either side of its straight-line direction of forward movement). On certain terrains, the progress of the carrier vehicle may even be accompanied by pitching movements, that is to say by pivoting about a transverse axis of the vehicle, and these movements can also impair the spreading uniformity.

The spreading uniformity obtained can also be disturbed when the axle or axles of the carrier vehicle do not remain perfectly parallel to the ground, for example because the wheel or wheels of the vehicle, located on the same side, are running in a furrow or rut. Since the spray-distributor remains approximately parallel to the axles, its different points are then no longer all at the same distance from the ground and, therefore, from the plants to be treated.

French Patent Specifications No. 1,564,543 and No. 2,100,130 as well as West German Patent Application No. 1,607,387 and United Kingdom Patent Application No. 2,014,834 describe mobile apparatuses for spraying a liquid for the treatment of plants, each of which comprises at least one spray-distributor which is mounted oscillating below an axis that is approximately horizontal and parallel to the longitudinal direction of the forward movement of the vehicle carrying the said distributor. This known arrangement, owing to the inertia of the spray-distributor, makes it possible, to a large extent, to prevent the latter from following all the rolling oscillations of the vehicle and, therefore, from deviating too often from parallelism with the horizontal ground, which would impair the spreading uniformity.

On the other hand, the movements or oscillations of pitching and yawing are still transmitted undiminished to the spray-distributor, so that they still disturb the spreading uniformity.

French Patent Application published under No. 2,305,116, describes a mobile spraying apparatus, the spray-distributor of which can be suspended from the carrier vehicle by a ball-and-socket bearing. Owing to this arrangement and to the inertia of the spray-distributor, none of the movements or oscillations of pitching, yawing and rolling is any longer transmitted undiminished to the said distributor; in fact, these erratic movements of the vehicle, at least when they are fairly slow, are now transmitted to the distributor only with major reductions in amplitude and, possibly, with delays, due, in particular, to friction at the level of the ball-and-socket bearing. Abrupt movements and shocks however result in imparting to the distributor oscillations of rather large amplitude relative to the vehicle, so that, especially during its pitching and yawing oscillations, the said distributor can violently hit certain parts of the vehicle; all this, again, impairs the spreading uniformity and may even damage the spraying apparatus.

French Patent Application published under No. 2,373,229 also describes a mobile spraying apparatus, the spray-distributor of which is linked to the carrier vehicle by a ball-and-socket bearing. However, means are provided for avoiding any pendulum movement of the distributor in the direction of motion, so that the pitching movements or oscillations of the vehicle are transmitted undiminished to the distributor. On the other hand, buffers immobilise the distributor rotating about the rolling axis, restricting it to oscillations of very low amplitude about that axis. As a result, in case of a major cant of the vehicle, the distributor cannot be returned to the horizontal position by the action of the pendulum suspension, as in the case of French Patent Application No. 2,305,116. In all, the arrangements described in French Patent Application No. 2,373,229 do not enable perfectly uniform spreading to be obtained in all conditions of movement of the carrier vehicle.

A chief object of the present invention is to improve the spreading uniformity produced by a spray-distributor with pendulum suspension, by further reducing the transmission of erratic movements of the carrier vehicle to the spray-distributor and by effectively damping the shocks which may be produced between the distributor and parts of the vehicle, especially when the distributor returns to its normal position relative to the vehicle after having been abruptly displaced therefrom by certain of its erratic movements which are particularly abrupt; this object must be achieved, moreover, without sacrificing the previously mentioned advantages of pendulum suspension.

The invention relates to a mobile apparatus for spraying a liquid for the treatment of plants, comprising a spray-distributor, one frame element of which is suspended by a ball-and-socket bearing from a support element which is fixed to a tractor vehicle or trailer vehicle. The apparatus according to the present invention is characterised in that rollers are mounted loose on one of said two elements, so as to roll normally on rolling surfaces of the other element, and that means are provided for returning the rollers into contact with the said rolling surfaces.

As a result of this arrangement according to the present invention, when the frame element of the distributor is displaced from the support element which is fixed to the vehicle, due to erratic pitching or yawing movements of the said vehicle, the return means tend immediately to bring the said elements back to their "normal"

relative position in which the rollers, mounted on one of the two elements, are in contact with the rolling surfaces provided on the other element; in this "normal" position, the spray-distributor is generally in a plane at right angles to the longitudinal axis of the carrier vehicle, that is to say in a plane at right angles to the mean direction of forward movement of the vehicle; in this same plane, the effect of the pendulum suspension is to place the distributor automatically in a horizontal position, which assists the spreading uniformity of the sprayed liquid; as regards the erratic rolling movements of the vehicle, the distributor follows them without the rollers ceasing to roll in contact with their rolling surfaces and with an amplitude which has been damped even further by the rolling friction of the said rollers.

In a first embodiment of the invention, the frame element of the spray-distributor is suspended from the ball-and-socket bearing by at least one arm which extends from the said frame element in the direction of the bearing and of the support element, and the rolling surfaces, when in contact with the rollers, are in an approximately vertical plane passing between the frame element and the bearing.

As a result of this arrangement, the combined weight of the distributor and of the arm supporting it exerts on this assembly, suspended in pendulum fashion from the bearing, an elastic return couple, which tends to bring the centre of gravity of the said assembly into the vertical plane passing through the said bearing; in fact, the pivoting of the assembly, produced by this couple, is arrested by the rollers coming into contact with their rolling surfaces in the vertical plane passing between the frame element and the bearing, so that the said contact is maintained by a residual elastic couple which is proportional to the weight of the said assembly and to the longitudinal spacing of the two vertical planes mentioned.

In a second embodiment of the invention, the return means are elastic means, arranged so as to push the rollers and the rolling surfaces normally into contact with one another.

According to a further advantageous characteristic of the invention, at least the rim of the rollers is made of an elastic material, which contributes to damping the return movements of the distributor to its normal position.

A particularly accurate, reliable and inexpensive guiding mechanism for the frame element of the distributor on the support element of the vehicle can be obtained in the following manner. The elastic means comprise a spring compressed between the frame element of the distributor and a rear abutment, integrated with one end of a rod which passes freely through the said frame element and the other end of which carries a loose roller capable of rolling, without axial displacement, along a roller track which is integrated with the support element.

Several embodiments of the mobile spraying apparatus according to the present invention are described below and are illustrated diagrammatically in the attached drawing by way of example; these are embodiments in which the spray-distributor is suspended conventionally at the rear of the carrier vehicle.

FIG. 1 is a view in rear elevation of a first embodiment.

FIG. 2 is a partial view in section along the line II—II of FIG. 1.

FIG. 3 is a partial side view in the direction of the arrow III of FIG. 1.

FIG. 5 is a view, corresponding to FIG. 4, of a second embodiment of the invention.

Figure 4:
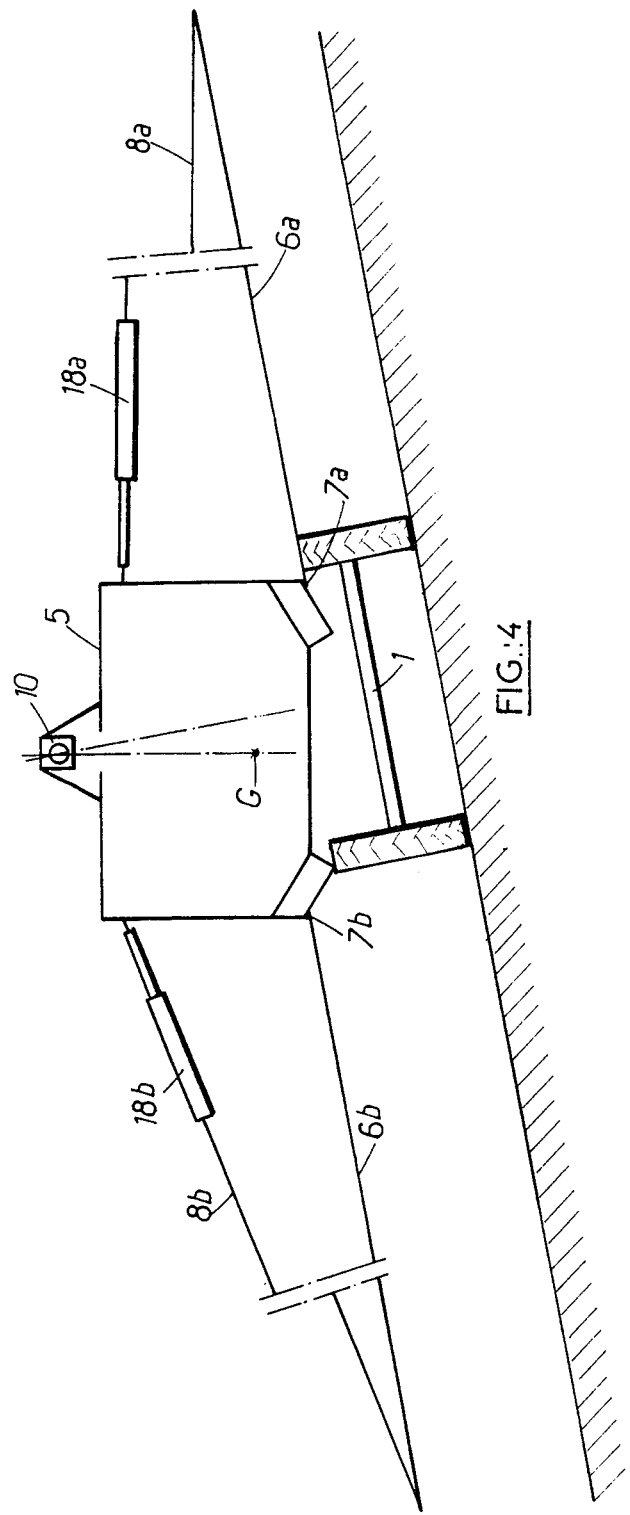
FIG. 4 is a view in rear elevation, corresponding to FIG. 1, for the case in which the carrier vehicle moves at right angles to the line of highest gradient of a sloping terrain.

In the first embodiment, illustrated in FIGS. 1 to 4, 1 denotes the single or rear axle of the carrier vehicle, the corresponding wheels being indicated by 1a and 1b. 2 denotes the rear part of the chassis of the carrier vehicle, which may be an agricultural tractor or a trailer, particularly a trailer carrying a large reservoir—not shown—of liquid for the treatment of plants. In the embodiment illustrated, posts 3a and 3b are welded to the rear part 2 of the chassis of the vehicle in a direction at right angles to the axle 1, that is to say vertically when the wheels 1a and 1b rest on a horizontal ground. An approximately rectangular frame 4, made, for example, of welded metal profiles, is mounted sliding on the posts 3a and 3b in a manner that is well known per se and, therefore, need not be described in detail. A jack 22 is mounted on the chassis 2 where it is integrated with the posts 3a and 3b, so that its vertical rod 22a can raise the frame 4 by letting it slide on the posts 3a and 3b, and immobilise it at a suitable height above the ground; these well-known lifting means are preferably operated by remote control from the cab of the tractor, which represents the carrier vehicle or which pulls the latter.

In this embodiment, the spray-distributor proper comprises in a manner that is known per se a central frame, 5, which is, for example, rectangular and is also made up of welded metal profiles; the spraying devices, which can be of any type and which have not been shown, are carried, in turn, by two side arms, 6a and 6b, each having an end articulated to the lower part of one of the lateral sides of the rectangular frame 5, so as to be able to pivot about an axis, 7a or 7b, at right angles to the plane of the rectangular frame 5. On the other side, each pivoting arm, such as 6a or 6b, is supported by a stay, 8a or 8b, one end of which is fixed on the corresponding side of the rectangular frame 5 at a point, 9a or 9b, located well above the corresponding axis 7a or 7b. The normal length of each of the stays 8a and 8b is such that they support the corresponding side-arm, 6a or 6b, of the spray-distributor in a position that is approximately at right angles to the corresponding lateral side of the rectangular frame 5.

According to the present invention, the upper side of the rectangular frame 5 is suspended from the corresponding upper side of the frame 4 by means of a bracket P, a ball-and-socket bearing 10, and a vertical piece, 11. As can be seen in the diagrammatic side view of FIG. 3, the lower end of the piece 11 is fixed on the upper side of the frame 4, while the upper end of this piece 11 is integrated with the ball of the bearing 10; the latter is also integrated with one end of the arm p1 of the bracket P, the other end of which is fixed to the upper side of the rectangular frame 5 of the distributor.

Two rollers, 12a and 12b, are mounted towards the lower corners of the rear face of the rectangular frame 4, for example in straps, so as to rotate freely about axes of rotation, the extensions ($\alpha$ and $\beta$ in FIG. 1) of which meet on the horizontal geometrical axis of the bearing 10; (this is, in fact, the geometrical axis, denoted by $\gamma$ in FIGS. 1 and 3, which passes through the centre of the ball of the bearing 10 and which is there at right angles to the plane of the rectangular frame 5). When, as will be explained later, the planes of the frame 4 and of the frame 5 are parallel to each other, in certain conditions which will also be specified below, the rollers 12a and 12b can roll on appropriate rolling surfaces, 5a and 5b (FIG. 1), mounted on the rear face of the said rectangular frame 5 and integrated, for example, with its lateral sides. The rollers 12a and 12b or at least their rims are preferably made of an elastic material which ensures good shock absorption, for example rubber, an elastomer, a plastic etc.

According to another characteristic of the invention, a helicoidal spring 13 is compressed between an element in the form of a plate, 5c, integrated with the lower side of the rectangular frame 5, on the one hand, and, on the other hand, a nut and lock-nut pair, 14, screwed onto one end of a threaded rod, 15; the other end of the rod 15 passes freely through the plate 5c and extends to near the rectangular frame 4 where the said end of the rod 15 carries a loose roller 16; the latter can roll, virtually without axial displacement, in a roller track 17, which, in the embodiment under consideration, is provided by an profile having a U cross-section, one flange of which is welded, for example, near the lower edge of the rectangular frame 4, while its other flange, which is approximately parallel to the plane of the frame 4, prevents the said roller 16 from slipping off. Preferably, the roller track 17 is curved so as to form a circular arc centered on the horizontal axis, $\gamma$, of the ball of the bearing 10. Since, however, the radius of curvature of the roller track 17 is large relative to its length, there is no objection to using a straight roller track and not a curved one.

When the tractor vehicle moves along an approximately level horizontal plane, the various elements of the spraying apparatus according to the present invention occupy, in relation to the said vehicle and to one another, the various relative positions that can be seen in FIGS. 1 to 3. The weight of the assembly, suspended from the bearing 10, which is applied at its centre of gravity G (FIG. 1), in fact maintains that assembly in the existing position of G in a vertical plane passing through the ball of the bearing 10; the lower and upper sides of the central frame 5 of the distributor and its arms 6a and 6b are consequently horizontal and consequently parallel to the ground, from which they are therefore equidistant at all points. The roller 16 is then in the middle of the guide-track 17, that is to say at its lowest point if it is curved. The spring 13, being supported, on one side, by the screw and nut system 14 and, on the other, by the plate 5c, presses the rectangular frame 5 against the rollers 12a and 12b. The assembly of the frame 4, with its accessories 12a, 12b and 17, and of the distributor 5-6 can have its height above the ground adjusted by vertical sliding of the said frame 4 on the posts 3a and 3b, with the aid of the previously mentioned means. If, however, the axle 1 of the carrier vehicle undergoes oscillations B about the horizontal axis b, which coincides with the direction of movement of the vehicle, or if the axle 1 remains inclined to the ground during the forward movement of the vehicle, owing to one of the wheels 1a and 1b running, for example, in a furrow or rut, the spray distributor assembly 5-6 resumes or retains the horizontal position, which can be seen in FIG. 1, due to its pendulum suspension, so that the disturbances mentioned, which occur in the forward movement of the carrier vehicle, are hardly transmitted to the distributor, the spreading uniformity of which is consequently maintained almost completely.

It is understood that it has been possible to maintain the distributor 5-6 in a horizontal position, despite the temporary or permanent inclination of the axle 1 of the tractor vehicle, only as a result of the rolling of the rollers 12a and 12b on the rolling surfaces 5a and 5b of the central frame 5, this latter movement being facilitated particularly by the elastic nature of the rims of the said rollers.

If, on the other hand, the tractor vehicle initiates a yawing movement C to the right or to the left of the axis b (FIG. 2), that is to say if its axle 1 starts to pivot about the vertical axis c (FIG. 1), this pivoting movement taking place, for example, in an anticlockwise direction, the rectangular frame 4, which is integrated with the chassis 2 by means of the posts 3a and 3b, carries out the same pivoting movement, but, as a result of its inertia, the central frame 5 of the distributor remains at right angles to the axis b, that is to say in the initial direction of forward movement of the vehicle, so that the roller 12a ceases to be in contact with the corresponding surface 5a of the said central frame 5, whereas the roller 12b remains in contact with the roller bearing surface 5b. The effect of this relative pivoting movement of the frame 4 and the frame 5 is to increase the compression of the spring 13; consequently, when, at the end of the yawing, the carrier vehicle resumes its initial direction of forward movement b, the said spring 13, on relaxation, pushes back the surface 5a of the central frame 5 into contact with the roller 12a.

Finally, the vertical vibrations A which the carrier vehicle can communicate to the frame 4, and consequently to the bearing 10, are damped by a gas and membrane damper, 23, of known type, which is connected in parallel to the feed-pipe 24 of the lifting jack 22.

In FIG. 4, the carrier vehicle is assumed to move in a direction approximately at right angles to the highest gradient line of an inclined ground, so that its axles, such as 1, are not horizontal but directed approximately along the highest gradient line. As a result of the pendulum suspension of the distributor below the bearing 10, its central frame 5 takes up the position which can be seen in FIG. 4, in which the centre of gravity G of the distributor is in a vertical plane passing through the centre of the ball of the bearing 10, the upper and lower sides of the frame 5 being horizontal. If, however, the arms 6a and 6b of the distributor were kept at right angles to the lateral sides of the frame 5, as in FIG. 1, they would not be equidistant from the ground at all points, since the arms of the distributor are then approximately in a vertical plane passing through the highest gradient line. In order to overcome this shortcoming and obtain uniform spreading, even in this operating case, the present invention provides for the insertion, in each of the stays, 8a and 8b, which respectively support the pivoting arms, 6a and 6b, of the distributor, of elements enabling the length of the said stays to be adjusted, for example in the form of jacks, 18a and 18b, which can be preferably operated by remote control from the cab of the tractor vehicle. It can be seen in FIG. 4 that it is always possible to adjust the length of the stays 8a and 8b by means of these lifting-jacks 18a and 18b, so that the two side-arms 6a and 6b of the distributor, by pivoting about their respective axes, 7a and 7b, both parallel to the highest gradient line of the ground.

In the alternative form illustrated in FIG. 5, the upper side of the central frame 5 of the distributor is suspended from the bearing 10 by means of a link 19, the lower end of which is preferably articulated at 19a in the middle of the said upper side of the central frame 5. On the other hand, rigid elements of adjustable lengths, such as jacks 20a and 20b, are respectively placed between the bearing 10 and points, 21a and 21b, on the upper side of the central frame 5, at a distance on either side of the point of articulation, 19a, of the link 19; in the illustrated embodiment, the two points 21a and 21b, at each of which an articulation is similarly provided, have been chosen near the two upper corners of the rectangular frame 5.

When the carrier vehicle moves forward, as illustrated in FIG. 5, in a direction that is approximately at right angles to the highest gradient line of a sloping terrain, the total lengths of the two jacks 20a and 20b are simultaneously adjusted, so that the lower and upper sides of the central frame 5 of the distributor are parallel to the highest gradient line of the ground, and, similarly, the axle 1 of the carrier vehicle, and that, at the same time, the centre of gravity G of the distributor lies in a vertical plane passing through the centre of the ball of the bearing 10. In this position of the central frame 5 of the distributor, its two side-arms 6a and 6b are approximately parallel to the highest gradient line of the ground, provided that, by virtue of their construction, the two arms mentioned extend at right angles to the lateral sides of the said rectangular frame 5; it is therefore not necessary, with this embodiment, to vary the lengths of the stays 8a and 8b in order to obtain perfectly uniform spreading, nor even to provide articulated joints at the ends of the arms 8a and 8b of the distributor which are fixed to the said frame 5.

The present invention is not limited to the embodiments described above. It includes all their alternative forms. In the case of the embodiment illustrated in FIG. 5, one of the two jacks, 20a and 20b, could be omitted. Their points of articulation, 21a and 21b, on the upper side of the rectangular frame 5 could be brought closer to the point of articulation 19a of the link 19. In the case of the embodiment illustrated in FIGS. 1 to 4, the spring device 13 to 17 could be replaced by equivalent elastic means, arranged so as to push the distributor 5-6 normally against the elastic rollers 12a and 12b. These elastic rollers, instead of being mounted on the rectangular frame, 4, sliding vertically, so as to roll on the corresponding surfaces, 5a and 5b, of the central frame 5, could be mounted on the latter, so as to roll on corresponding surfaces of the sliding frame 4. The elastic rollers 12a and 12b could be replaced possibly by rigid rollers. The elastic means for pushing the central frame 5 of the distributor in the direction of the sliding frame 4 could be omitted; in fact, in this case, the weight of the assembly 5-6a-6b-P, suspended in pendulum fashion from the swivel 10, would be large enough to apply the rolling surfaces 5a, 5b against the rollers 12a and 12b. The damper 23, designed to absorb the shocks and vibrations in a vertical direction, is optional. For the applications where it is not necessary to provide a possibility of regulating the height of the spray-distributor, it is possible to omit the sliding frame 4 as well as the vertical posts 3a and 3b; in this case, the spray-distributor according to the present invention can be directly suspended below a support, which is integrated with the vehicle, for example having the shape of the double bracket, by a ball-and-socket bearing. The present invention is applicable in whatever way the spray-distributor is made up and, for example, it may not comprise a central frame such as 5 and/or comprise only one side-arm. The present invention is also applicable to a spray-distributor which is suspended not behind the carrier vehicle but, for example, in front of the latter or in an intermediate position. It is also applicable to the pendulum suspension of several spray-distributors on the same carrier vehicle.

I claim:

1. Mobile apparatus for spraying a liquid for the treatment of plants, comprising a support element, fixed to a tractor vehicle of trailer vehicle, at least one spray-distributor with a frame element suspended by a socket-and ball bearing from the said support element, rollers mounted loose on parts of one of the said elements, rolling surfaces arranged on the other element in a substantially parallel relationship to said parts of said one element, and means for returning the said rollers into contact with the said rolling surfaces.

2. Apparatus according to claim 1, in which the frame element of the spray-distributor is suspended from the bearing by at least one arm extending from the said frame element in the direction of the bearing and the support element, and the rolling surfaces, when in contact with the rollers, are situated in an approximately vertical plane which passes between the frame element and the bearing.

3. Apparatus according to claim 1, in which the return means are elastic means, arranged so as to push the rollers and the rolling surfaces normally into contact with one another.

4. Apparatus according to claim 3, in which the elastic means comprises a spring compressed between the frame element of the distributor and a rear abutment, a rod which passes freely through the said frame element, having a first end integrated with the said rear abutment and a second end carrying a loose roller arranged to roll, without axial displacement, in a roller track, which is integrated with the said support element.

5. Apparatus according to claim 4, in which the roller track is curved so as to form a circular arc, centred on the horizontal axis of the bearing.

6. Apparatus according to claim 1, in which at least the rim of the rollers is made of an elastic material.

7. Apparatus according to claim 1, in which the axes of rotation of the rollers have extensions which meet on the horizontal geometric axis of the bearing.

8. Apparatus according to claim 1, in which the frame element of the distributor carries at least one distributor side-arm having one end articulated to the said frame element and the said side-arm is supported by a stay of adjustable length.

9. Apparatus according to claim 1, in which the frame element of the distributor carries at least one distributor side-arm, an articulated link is placed between the bearing and the said frame element, and at least one rigid element of adjustable length is placed between the bearing and a point of the said frame element at a distance from the articulated joint of the said link.

* * * * *